March 17, 1931.　　V. W. SCHULTZ　　1,796,877
HARNESS FOR LIVE BAIT
Filed June 23, 1930
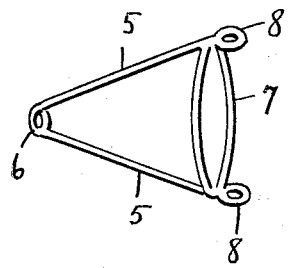
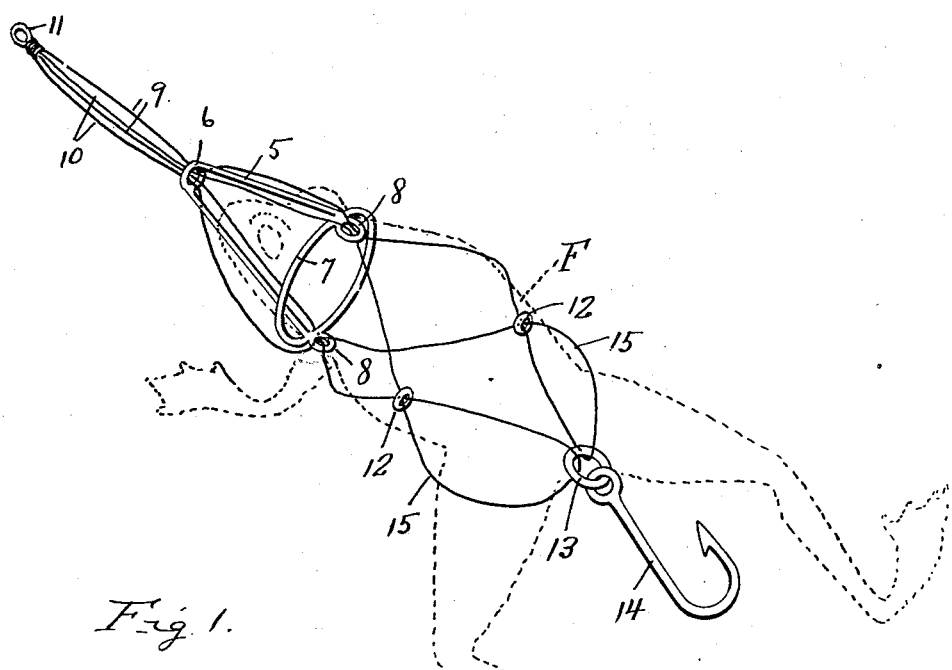
Inventor
Vilas W. Schultz
By Clarence A. O'Brien
Attorney Patented Mar. 17, 1931

1,796,877

UNITED STATES PATENT OFFICE

VILAS W. SCHULTZ, OF ST. PAUL, MINNESOTA

HARNESS FOR LIVE BAIT

Application filed June 23, 1930. Serial No. 463,137.

This invention relates to certain new and useful improvements in harness for bait, and the primary object of the invention is to provide a harness especially adapted for use with live bait such as frogs and the like.

A still further object of the invention is to provide a harness of the character above mentioned, which is capable of accommodating bait of various sizes, will in no wise injure the bait, and which will, at the same time, permit freedom of movement to the bait without possibility of the bait escaping from the harness.

Other objects and advantages of the invention will become apparent during a study of the following description taken in connection with the accompanying drawings wherein:

Figure 1 is a perspective view of the harness, the same being shown as applied to a frog.

Figure 2 is an elevation view of the head frame of the harness.

With reference more in detail to the drawings, it will be seen that the harness comprises a head frame, the same including a pair of relatively spaced concentric rings, including a relatively large ring 7 and a relatively small ring 6. Rings 6 and 7 are connected together and held in fixed relation with respect to one another through the medium of oppositely disposed bars 5—5.

In actual practice, the head of the frog F is passed through the ring 7 into the frame as suggested in Figure 1.

The harness further comprises a pair of wires 9 and 10 secured at their ends to an eye member 11 that in turn is adapted to be secured to the end of the fishing line. Ring 7 on diametrically opposite sides thereof is provided with integral eyes 8. The wires 9 and 10 are passed through the ring 6, and opposite portions of the wires are then subsequently passed through the eyes 8. The frame is so disposed about the head of the frog that one of the eyes 8 is disposed at the front of the frog and the other of the eyes 8 is disposed at the rear of the frog.

A portion of each wire 9 and 10 is then passed through a ring 12, there being two of such rings 12. The wires thus passed through the rings 12 provide leg accommodating loops 15. The wires 9 and 10 at their looped portions 15 are passed through a ring 13, with which ring 13 is engaged the eye of a conventional type of fish hook 14.

The wires 9 and 10 together with the frame thus accommodate the frog in the manner suggested in Figure 1, and it will be apparent that the harness thus applied to the frog will permit freedom of movement to the frog without possible injury or escape of the frog from the harness.

Even though I have herein shown and described the preferred embodiment of the invention, it is to be understood that the same is susceptible to changes, modifications, and improvements coming within the scope of the appended claims.

Having thus described my invention, what I claim as new is:—

1. In a harness for bait, a frame member adapted to accommodate the head of the bait and comprising a relatively large ring, and a relatively smaller ring concentric of and spaced with respect to the large ring, oppositely disposed members connecting said rings, said large ring on opposite sides thereof provided with an eye, a pair of looped wires having their ends connected together, said wires extending through the smaller of said rings, and having opposite end portions passing through said eyes, a hook, and a ring carried by the shank of said hook and through which said wires are passed.

2. A harness for live bait comprising a frame member adapted to accommodate the head of the bait, a pair of looped harness wires, a ring, said wires being passed through said ring and extending through said head frame, the ends of said wires being connected together, and a hook carried by said ring.

In testimony whereof I affix my signature.

VILAS W. SCHULTZ.